Dec. 10, 1957 T. H. STOODLEY 2,815,583

AUTOMATIC PHONOGRAPH ADJUSTING TOOL

Filed Aug. 31, 1956

INVENTOR.
THOMAS H. STOODLEY,
BY
McMorrow, Berman & Davidson
ATTORNEYS.

United States Patent Office 2,815,583

Patented Dec. 10, 1957

2,815,583

AUTOMATIC PHONOGRAPH ADJUSTING TOOL

Thomas H. Stoodley, Calgary, Alberta, Canada

Application August 31, 1956, Serial No. 607,339

3 Claims. (Cl. 33—180)

This invention relates to apparatus for checking the adjustments of phonographs, and more particularly to a a tool for checking the various adjustments of automatic record players.

A main object of the invention is to provide a novel and improved tool for checking the adjustments of automatic record players, such as, for checking the indexing of a record player for various sizes of records to be used on the record player, for checking the "push-off" of automatic record players for various sizes of records, for checking the needle height of a record player with respect to the turntable thereof during cycling of the record player, and for checking the operation of the automatic indexing finger or lever on record players employing same.

A further object of the invention is to provide an improved tool for checking the various adjustments of automatic record players, said tool being simple in construction, being easy to use, and eliminating the necessity of using a phonograph record for the purpose of testing the adjustment of a record player, whereby the possibility of damaging the record during such a test is avoided.

Further objects and advantages of the invention will become apparent from the following description and claims, and from the accompanying drawings, wherein:

Figures 1, 2, 3, 4:
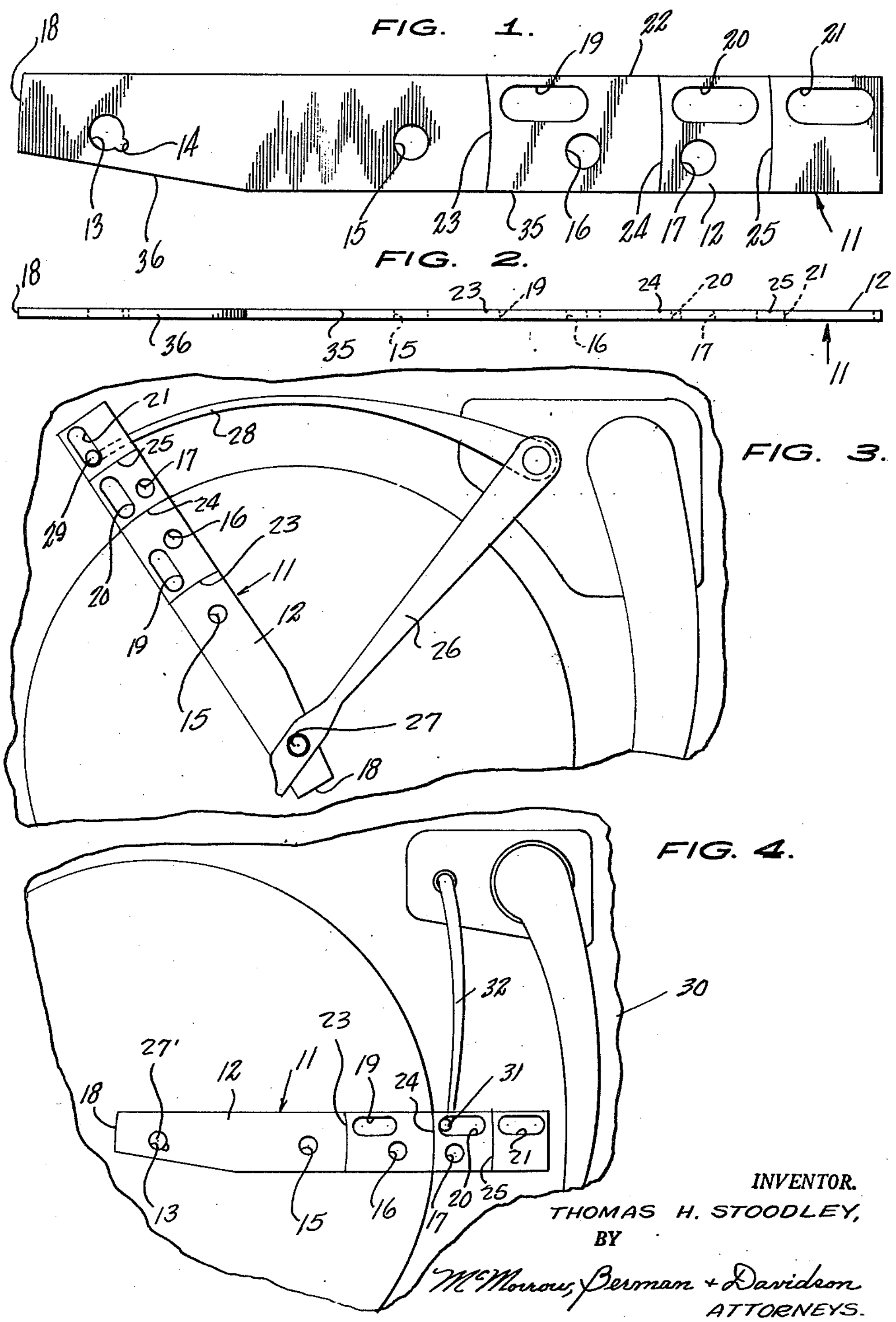
Figure 1 is a plan view of an improved tool for checking phonograph record player adjustments, in accordance with the present invention.
Figure 2 is a side elevational view of the tool of Figure 1.
Figure 3 is a fragmentary top plan view showing the manner in which the tool of Figure 1 is employed to prevent "shut-off" and to check automatic indexing of a conventional type of automatic record player.
Figure 4 is a fragmentary top plan view similar to Figure 3 but illustrating the manner in which the tool of the present invention is employed to prevent "shut-off" and to check the indexing adjustment of another conventional type of automatic record player.

Referring to the drawings, the record player adjustment tool is generally designated at 11 and comprises a flat bar member 12 of suitable material, such as metal, the bar member being formed adjacent one end thereof with an opening 13 adapted to fit on the center post of a record player, the opening 13 being generally circular and being formed with a notch 14 therein to provide clearance for the "push-off" finger of a record player spindle and to prevent the "push-off" finger from catching when the tool is employed for preventing "shut-off" and for checking the automatic indexing on an automatic record player such as is illustrated in Figure 3, and as will be presently explained.

The bar member 12 is formed with a plurality of spaced circular openings 15, 16 and 17, said openings being spaced from the end edge 18 of the bar member by respective distance corresponding to the distances between the center post and the back rest "push-off" element of a record player of the back rest "push-off" type, for the different sizes of records, namely, for the seven inch record, the ten inch record, and the twelve inch record respectively.

As is shown in Figure 1, the end edge 18 is arcuate in shape and the curvature is such that the center thereof coincides with the center of the circular opening 15.

The bar member 12 is further formed with the spaced slots 19, 20 and 21 located adjacent the end of bar member 12 opposite the arcuate end edge 18, the slots 19, 20 and 21 being spaced to receive the indexing finger of a record player in different positions of the bar member with the opening 13 engaged on the center post of the record player, said different positions, corresponding to the different sizes of records, namely, seven inch, ten inch and twelve inch records. Each of the slots 19, 20 and 21 is of similar length, being approximately three-quarters of an inch long, the slots being arranged in alignment with each other and being located adjacent one side edge 22 of bar member 12, as shown in Figure 1.

The bar member 12 is further formed with three concentric arcuate grooves 23, 24 and 25 centered at the center of the opening 13, the arcuate grooves 23, 24 and 25 being spaced from the opening 13 so as to check the indexing for seven, ten and twelve inch records when the opening 13 is engaged on the center post of an automatic record player being checked. Thus, the arcuate groove 23 serves as a means to check the accuracy with which the needle is lowered on to the beginning grooves of a seven inch record, with the bar member placed on a record player and with the center post of the record player received in the opening 13.

Figure 3 illustrates the manner in which the device 11 is used to check the indexing of a Webster Model 100 automatic record player. When used in this manner, the device is positioned beneath the ballast arm 26 of the record player with the center post 27 thereof engaged through the opening 13 of the device and the device resting on the shoulder of the center post 27. The indexing arm 28 of the record player is engaged through one of the slots 21, 20 or 19, depending upon whether the indexing is to be tested for twelve, ten or seven inch records, the upstanding indexing element 29 of arm 28 passing through the selected slot. With the device 11 arranged as shown in Figure 3, "shut-off" of the record player is prevented and the automatic indexing of the Webster Model 100, or similar model record players may be checked.

To check the indexing of a Garrard Model RC 80, RC 90 or similar record players, such as shown at 30 in Figure 4, the device is engaged on the record player with the center post 27' of the record received in the opening 13 and the upstanding end portion 31 of the indexing arm 32 of the record player received in a selected slot 19, 20 or 21, depending upon the size of record for which the indexing is to be checked. In Figure 4, the upstanding element 31 of the indexing arm 32 is received in the slot 20, whereby the indexing for a ten inch record may be checked. As arranged in Figure 4, the device 11 prevents "shut-off" of the record player and allows the indexing action thereof to be checked.

As above explained, the grooves 23, 24 and 25 serve to check indexing for seven, ten and twelve inch records of the type having center openings adapted to slidably engage on the center post of the record player.

To check the "push-off" on record players of the back rest "push-off" type, the device is engaged on the center post of the record player through one of the openings 15, 16 or 17, depending upon which size of record the "push-off" of the record player is to be checked for, and the arcuate end edge 18 is engaged on the "push-off" seat of the record player. If properly adjusted, the "push-off" seat of the record player will displace the tool so that the tool will slip past the shoulder on the spindle and will drop onto the turntable, simulating the movement of an actual record.

Similarly, to check the operation of center post "push-off" mechanisms in record players employing same, the device 11 is engaged on the center post of the record player through one of the openings 15, 16 or 17, being supported on the seat of the center post, the device 11 being then supported on the ballast arm of the record player or being supported manually if no ballast arm is present, whereby the device will simulate the movement of an actual record in response to the operation of the "push-off" mechanism of the record player and will drop onto the turntable of the record player if said mechanism is correctly adjusted.

The device may also be employed to check automatic indexing on record players that employ an indexing finger or lever that is struck by a falling record. This is accomplished by engaging the device 11 on the center post of the record player employing a center opening 15, 16 or 17, depending upon the selected size of record for which the operation is to be tested and by employing the arcuate end edge 18 of the tool to trip the indexing finger or lever, and to simulate the action of the periphery of an actual record dropped onto the record player turntable.

The bar member 12 is of a width substantially corresponding to the correct needle height of an automatic record player during record transfer, whereby the device 11 may be employed as a gauge device to check the needle height above the turntable of the record player. As will be readily apparent, this is accomplished by holding the bar member 12 on the turntable in a position arranged vertically and engaging the turntable at its longitudinal edge 35. To facilitate the use of the device for this purpose, the portion of said longitudinal edge 35 adjacent opening 13 is inclined inwardly, as shown at 36.

In an actual embodiment of the invention, the bar member 12 is approximately one inch wide and has a total overall length of seven and one-half inches. The opening 13 is spaced three quarters of an inch from the arcuate end edge 18, which has a length of approximately eleven sixteenths of an inch. The tapering edge portion 36 extends a distance of approximately two inches from the end edge 18. In said practical embodiment of the invention, the opening 15 is spaced three and twenty-seven sixty-fourths inches from end edge 18, the opening 16 is spaced four and fifty-nine sixty-fourths from the end edge 18, and the opening 17 is spaced five and fifty-nine sixty-fourths from end edge 18. In this practical embodiment of the invention, the groove 23 has a radius of three and eleven thirty-second inches, the groove 24 has a radius of four and thirteen-sixteenths inches, and the groove 25 has a radius of five and thirteen-sixteenths inches. The slot 19 has its inner end spaced three and twenty-seven sixty-fourths inches from the center of the opening 13, the slot 20 has its inner end spaced four and fifty-nine sixty-fourths inches from the center of the opening 13, and the slot 21 has its inner end spaced five and fifty-nine sixty-fourths inches from the center of the opening 13. Each slot 19, 20 and 21 is nine thirty-seconds of an inch wide, and the upper edges of the slots, as viewed in Figure 1, are spaced three thirty-seconds of an inch from the longitudinal edge 22 of bar member 12. The center of the opening 13 is located one-half inch from longitudinal edge 22 of bar member 12 and three-quarters of an inch from the arcuate end edge 18 of said bar member.

While a specific embodiment of an improved adjustment tool for checking the adjustments of automatic record players has been disclosed in the foregoing description, it will be understood that various modifications within the spirit of the invention will occur to those skilled in the art. Therefore it is intended that no limitations be placed on the invention except as defined by the scope of the appended claims.

What is claimed is:

1. A tool for checking the adjustments of automatic record players comprising a flat rigid bar member formed adjacent one end with an opening adapted to fit on the center post of a record player and formed with a plurality of spaced longitudinal, aligned slots adjacent its other end, said slots being spaced to receive the indexing finger of a record player in different positions thereof, with said first named opening engaged on the center post of the record player, corresponding to the different sizes of records to be used on the record player, said bar member being formed with concentric arcuate grooves having a common center at the first-named opening and being spaced from the first named opening at respective radial distances corresponding to the index distances for different sizes of records.

2. A tool for checking the adjustments of automatic record players comprising a flat rigid bar member formed adjacent one end with an opening adapted to fit on the center post of a record player and formed with a plurality of spaced longitudinal, aligned slots adjacent its other end, said slots being spaced to receive the indexing finger of a record player in different positions thereof, with said first named opening engaged on the center post of the record player, corresponding to the different sizes of records to be used on the record player, said bar member having an arcuate end edge adjacent said first named opening and being formed with additional openings spaced from said arcuate end edge distances slightly smaller than the radii of the different sizes of records.

3. A tool for checking the adjustments of automatic record players comprising a flat rigid bar member formed adjacent one end with an opening adapted to fit on the center post of a record player and formed with a plurality of spaced longitudinal, aligned slots adjacent its other end, said slots being spaced to receive the indexing finger of a record player in different positions thereof, with said first named opening engaged on the center post of the record player, corresponding to the different sizes of records to be used on the record player, said bar member being formed with concentric arcuate grooves having a common center at the first-named opening and being spaced from the first named opening at radial distances corresponding to the index distances for different sizes of records, said bar member having an arcuate end edge adjacent said first named opening and being formed with additional openings spaced from said arcuate end edge distances substantially equal to the radii of the different sizes of records, said bar member being of a width substantially corresponding to the needle height of an automatic record player during record transfer.

References Cited in the file of this patent

UNITED STATES PATENTS

| | | |
|---|---|---|
| 711,763 | Fox et al. | Oct. 21, 1902 |
| 1,211,793 | Horvath | Jan. 9, 1917 |
| 2,014,190 | Simon | Sept. 10, 1935 |
| 2,500,873 | Sager | Mar. 14, 1950 |